United States Patent Office 3,395,048
Patented July 30, 1968

3,395,048
METHOD FOR MAKING POROUS ALKALI
METAL ELECTRODES
Jack D. Pavlovic, Palo Alto, Calif., assignor to
Electrochimica Corp., Menlo Park, Calif.
No Drawing. Filed Mar. 18, 1966, Ser. No. 535,334
9 Claims. (Cl. 136—120)

This invention relates to anodic electrodes for non-aqueous batteries; and more specifically to a method of pulverizing a metal selected from the group consisting of lithium, sodium, potassium, cesium and rubidium and treating the powder in an inert environment to form a porous electrode comprising particles that have clean metallic surfaces and are electrochemically active (reference hereinafter to a specific member of the aforementioned group will be understood to be exemplary and that other metals of the group generally may be substituted).

Due to the high reactivity of lithium, its use in galvanic cells heretofore has been limited, and the methods for so doing complex and costly. Moreover, so far as I know, a method of successfully producing a porous lithium electrode having clean reactive surfaces has long been sought. The advantage of a porous lithium electrode is the high ratio of true area to apparent geometrical area which may provide high current densities otherwise not possible using the metal in solid form. To achieve this advantage of high current density in a porous electrode, however, the individual particles that comprise the electrode mass require a high degree of surface cleanliness free of oxidation products and other contamination. By my relatively simple and novel method, described in detail hereinafter, I produce such electrochemically clean particles in a powder form which also relatively easily worked to a desired shape and volume porosity.

Lithium, like some of the other metals in the aforementioned group rom which it is selected, is available in both solid and particulate form and usually kept immersed, prior to use, in a relatively inert liquid medium such as mineral oil or the like. Most such carrier liquids, however, contain at least traces of water and certain gases which tend to react with the surface of the metal or powder grains immersed therein. Thus anodic electrodes prepared from such partly oxidized or otherwise surface reacted metals or powders are electrochemically inefficient, if operative at all, and may cause high internal cell resistance and low faradaic efficiency, as that term is known and used in the battery art.

Moreover, conventional powdered lithium generally includes particle sizes which are relatively small. Porous electrodes made from such fine powder may become objectionably dense and therefore not as capable of providing high energy output compared to electrodes fabricated from powders having larger grain size as produced by my inventon. Also, in conventional slurries of fine lithium powders, the percentage of material contaminated by oxides, nitrides, and the like, is relatively high compared to the total active metallic material. Moreover, it is difficult to achieve a coherent, porous mass of predetermined shape to form the electrode because, due to the surface impurities, the particles are relatively difficult to fuse at ordinary temperatures and pressures.

Thus a primary object of this invention is to provide a method for producing a powder made from a metal selected from the group consisting of lithium, sodium, potassium, rubidium and caesium, having relatively clean surfaces and fabricating such powder to form a coherent, porous, anodic electrode for use in galvanic cells.

More specifically, it is an object of this invention to provide a method for making a powder of a metal selected from the aforementioned group by first providing a zone having a substantially pure atmosphere of a gas inert to the metal about to be pulverized. The metal is then immersed in a quantity of liquid, stationed within the inert zone, which is non-reactive with the metal and ground in the liquid which acts as a lubricant and protects the metal from contact with even those traces of reactive gases, such as oxygen, nitrogen and water vapor, present in the substantially inert atmosphere. Grinding is continued until a powder is formed comprising the desired newly formed particulate matter with exposed and polished surfaces which are chemically and reactively clean. The powder, and a portion of the liquid in which it is ground and which remains entrained with the powder, is then physically separated and may be stored in a damp (relatively inert) condition. Alternatively, the separated powder and entrained liquid may be dried, if the liquid has a relatively low boiling point, in a vacuum or inert atmosphere chamber, e.g. helium, argon, or the like, to drive off any liquid prior to working into final electrode shape.

It is also an object of this invention to produce a metal powder which is relatively fusible at reasonably low temperatures and pressures and formable to provide a porous, cohesive mass of predetermined shape without the use of external agents such as binders. Such a porous mass, fabricated in accordance with conventional electrode structure, and which may include some form of conductive metal grid embedded therein with a tab or the like for external electrical hook-up, is particularly adaptable as the anodic electrode of a galvanic cell.

A feature and an advantage of my invention is that the powder formed by my novel method, having a selective particle size with electrochemically clean and reactive surfaces, may be made into anodic electrodes having relatively high current densities for application in non-aqueous batteries.

It is another object of my invention to provide washing of the powder and entrained liquid after separation by flowing a solvent therethrough which is non-reactive with the metal and in sufficient amount to remove most of the liquid in which it is ground. This may be done when the liquid in which the metal is originally immersed has a relatively high boiling point and tends to be oily, or may contain relatively high amounts of contaminants, and the boiling point of the relatively contaminant-free solvent is substantially lower than that of the liquid.

A feature and an advantage of the aforementioned step of washing is the flushing away of the carrier liquid, which may also have been used during the relatively short grinding period, and of any impurities therein which could oxidize or otherwise contaminate the surface of the immersed metal or powder if contact is sustained.

Another object of my invention is to provide grading of the powder prepared by grinding during the step of washing by causing the particles of the power of less than the predetermined size to be carried away with the flowing of the wash solvent.

Numerous other objects, features and advantages will become apparent upon a reading of the specification which follows.

The invention is best understood by the following example which illustrates one embodiment of my novel process. It is understood that although reference hereinbelow is made to lithium, this is by way of example only, and other metals selected from the group consisting of lithium, sodium, potassium, rubidium and cesium may be employed. Also, although a specific example is set forth, a few alternative procedures are also described in the specification that follows.

A conventional inert dry box or chamber is provided in which a positive pressure of argon is maintained at all times, although other inert gases with respect to the metals hereinabove recited may be utilized; for example, helium, suitable mixtures of $CO_2$ and hydrogen, or the like. The dry box is of the type provided with means by which an operator may manipulate items located therein while remaining entirely outside of the pressurized and inert gas zone within the box. Such structures are commonly provided with glove-like manipulators or other suitable devices to operate equipment within the box itself.

Lithium in chunk form, as commonly available in a closed container and immersed in mineral oil or the like, may be provided and introduced into the dry box through a conventional transfer compartment remaining in a closed condition. Initially, if the lithium is in a relatively large solid piece, it is removed from its container and protective liquid inside the dry box and sliced either mechanically or manually, as by means of a knife or other suitable device.

The lithium pieces are then placed in a colloidal mill, Waring Blendor, or other suitable grinding or pulverizing apparatus in which additional mineral oil or other suitable lubricating and protective liquid has been added, and the entire mixture ground. I have found satisfactory results here using a standard Waring Blendor, immersing the lithium in the same oil in which it comes commercially packaged, usually mineral oil, and grinding for a period of from 15 to 60 minutes, depending upon the size range of particulate matter desired for the electrode fabrication which follows. The resulting lithium powder, which generally floats on the surface of the oil or lubricating liquid, is then skimmed off using a palate or the like, and placed into a vessel containing a liquid such as an aliphatic or aromatic hydrocarbon of the type which does not react chemically to the prepared powder; for example, in the case of lithium, N-hexane has been found satisfactory. The initial N-hexane washing removes substantially the mineral oil or other lubricating liquid from the particles of the ground lithium.

The above prepared powder is then removed from the previous bath or washing and placed on a dense screen; for example, I have used 200 mesh or smaller, depending upon the minimum particle size desired in the finished powder product. A flow of fresh N-hexane is then provided to wash out any residual oil from the surface of the lithium powder which also flushes through the mesh substantially all particles which are less than 200 mesh. The washing operation with N-hexane may then be repeated; and I have found it preferable so to do. During the second washing the powder may be placed on, for example, a 20 mesh screen and the flushed material collected in a container to which the second N-hexane flow is directed. I utilized the latter step on the same sample I washed on a 200 mesh screen. In this way all particles over a certain size, in the example given .83 milimeters across the largest dimension, are retained on the screen and may be returned to the grinding apparatus for subsequent grinding. Thus a specific size range of particles, namely from not gerater than 20 to not less than 200 mesh may be obtained; and the lower limit may be selected at about 325 mesh.

Washing with N-hexane may be repeated again and the damp material stored in sealed containers under an inert atmosphere to prevent oxidation or other contamination which may be caused by traces of residual oxygen or other undesirable gases in the dry box atmosphere. Reasonable care should be taken to completely fill the storage containers with powder and liquid N-hexane to prevent oxidation or other reaction of the lithium during storage.

It should be noted that the introduction of N-hexane in the steps described hereinabove are of particular importance when the lithium or other such metal comes packed in mineral oil or the like. Such oils sometimes contain at least trace amounts of water and certain gases such as air, nitrogen, and the like, which may attack lithium. Although these impurities may be quite low in concentration, over a long period of time they may cause an appreciable degree of contamination of the lithium surface. Moreover, oils, particularly those having a boiling point greater than about 180° C., tend to coat the particles even after drying. Such residual oil on the particles of metal powder makes forming difficult and virtually destroys the ability of the material to act effectively in a cell as an electrode. Solvents are selected, such as normal hexane, which are capable of washing away the heavier residual, higher boiling oils; but which, like normal hexane, have relatively low boiling points, i.e. less than about 130° C., are non-oily, and may be driven off by drying in an inert atmosphere after the carrier liquid has been washed away.

Prior to grinding into powder form, the relatively small percentage of surface area which may become oxidized, compared to the final surface area of the total particulate mass, is not generally critical. Hence, a mineral oil or other such liquid carrier may be tolerated during initial storage of lithium in large sizes and even during grinding, where the surface of the particulate material is in contact with the carrier liquid for a relatively brief period of time. However, once the small particle surfaces are formed in the carrier liquid used during grinding to lubricate the process and prevent contact with certain undesirable gases present even in the dry box atmosphere, such carrying liquid should be removed by flushing with a relatively contaminant-free solvent. Such solvent should be selected, as indicated above, from the class of aliphatic or aromatic hydrocarbons which do not react with the pulverized metal; which are capable of dissolving the heavier oil in which the metal may have been originally immersed and ground; and which itself may be driven off by conventional drying techniques, i.e. preferably with a boiling point below about 130° C. Thus, N-hexane, benzene, toluene, or other suitable relatively low boiling aliphatic or aromatic hydrocarbon solvents, which do not react with lithium and are relatively free of entrained gases such as air, oxygen, water vapor and nitrogen, should be introduced to flush away the mineral oil or other initial carrier liquid, if the latter to begin with is not itself one of those aliphatic or aromatic hydrocarbons mentioned above and having a relatively high degree of purity.

It should be emphasized that one of the important aspects of my invention is that I produce lithium powder whose particulate surface is relatively electrochemically clean and active and provides surfaces which are polished, i.e. relatively free of surface contaminants such as oxide, nitrides and the like. It is this aspect of my novel process which provides me with a powder which may be compressed and formed, using conventional equipment known in the electrode art, by fusion or cold sintering of the clean particles of the anodic metal without interference of the surface impurities which could prevent such fusion or cold sintering at relatively low temperatures and pressures.

The next step of my novel process may be performed immediately after the washing described hereinabove; or alternatively, if the powder has been stored, after its removal in the protected environment of the dry chamber. Such next step is the vacuum drying at room temperature to remove any traces of N-hexane.

After drying, a weighed amount of powder is added under the protection of an inert atmosphere to the cavity of a polished cavity-type stainless steel die of the type known in the art of preparing electrodes and hence not shown nor further described herein. The flanges of one set of the mating dies may be provided with shim stock so a predetermined volume percent density is obtained upon drawing the dies together and compressing the lithium material to form the electrode. An initial amount of powder may be introduced into one of the dies followed by placement thereon of a suitable conductive grid or electrode supporting structure which is to become embedded in the electrode as finally fabricated. The remainder of the predetermined weighed amount of powder is then added prior to final pressing by the second and mating die. The mating die is then infused and pressure applied at a preselected temperature as stated elsewhere herein to fuse the particles of powder together leaving a predetermined amount of void space. Where a conductive grid is inserted, the adjacent particles thereto are also cold sintered to the grid. The dies are then separated, and the finished electrode product of defined porosity may be removed therefrom for immediate use as the anodic electrode of a galvanic cell, or stored in a protected environment for later use.

I have found that in a lithium electrode a porosity which corresponds to a void percentage ranging from about not less than 15% to about not more than 70% is preferable. By using powder produced by my novel process, fusion can be achieved under reasonably low temperatures and pressures; for example, in the case of lithium powder, satisfactory results have been obtained at a die pressure of not more than 6000 p.s.i. and with temperatures not greater than about 150° C. Temperatures at the high end of the range have been found preferable to obtain a relatively higher degree of fusion or bonding. At all temperatures herein stated, a coherent electrode structure is obtained without the use of foreign materials as binders or by the use of relatively high temperatures which result in sintering of the electrode material to the supporting grid as is known in conventional electrode fabrication.

The electrode structure described herein, insofar as it comprises a pressed material which may have embedded therein a grid or other conductive device, is not per se a part of the claimed invention. Therefore the electrode is not shown nor described further herein. My invention resides in the novel method I have developed for the preparation of the aforementioned metal powders, and the steps for fabricating such powders to form a porous electrode.

Although I have described my invention in the foregoing specification with some degree of particularity and detail, this has been by way of example to clearly illustrate my novel process. It is understood that a number of variations may be practiced within the spirit thereof and scope of appended claims.

I claim:

1. A method for making a powder of a metal selected from a group consisting of lithium, sodium, potassium, rubidium and cesium for use in the fabrication of an anodic electrode in a galvanic cell, comprising the steps of:

providing a zone having an atmosphere of a gas inert to said metals;

immersing said metal in a quantity of liquid stationed within said zone, said liquid being chemically non-reactive with said metal and adapted to act as a lubricant thereof and protect the metal from contact with gaseous impurities that may be present in said zone;

grinding said metal in said liquid within said zone for an interval of time sufficient to pulverize the metal to a powder having a predetermined range of particle size and polished by said grinding to have chemically reactively clean surfaces;

whereby said powder is fusible at relatively low temperatures and pressures to form a porous, cohesive mass of predetermined shape without the use of binders, said cohesive mass adaptable to form the anodic electrode of a galvanic cell;

separating said powder and the portion of said liquid entrained with the powder while in said zone; and drying said powder in an inert atmosphere to drive off any liquid entrained with the powder.

2. The method in accordance with claim 1 and wherein further, after said step of separating and before said step of drying, washing said powder and the portion of said liquid entrained therewith by flowing a solvent therethrough in sufficient amount to remove substantially said liquid, said solvent being non-reactive with said metal and having a boiling point below about 130° C.; and grading said powder by said step of washing by causing particles of the powder of less than a predetermined size to be carried away with the flowing of said solvent.

3. The method in accordance with claim 1 and wherein further causing said step of grinding for an interval of time sufficient to pulverize the metal to a powder having a size range of not greater than about 20 mesh to not less than about 325 mesh.

4. The method in accordance with claim 2 wherein said liquid is mineral oil and said solvent is a liquid selected from the group consisting of relatively low boiling aliphatic and aromatic hydrocarbons being chemically non-reactive with said metal and relatively free of contaminants capable of reacting chemically with the metal.

5. A method for making an anodic electrode utilizing a metal selected from the group consisting of lithium, sodium, potassium, rubidium and cesium, for use in a galvanic cell comprising the steps of:

providing a zone having an atmosphere of gas inert to said metal;

immersing said metal in a quantity of liquid stationed within said zone, said liquid being chemically non-reactive with said metal and adapted to act as a lubricant thereof;

grinding said metal in said liquid within said zone for an interval of time sufficient to pulverize the metal to a powder;

polishing by said step of grinding the particles of said powder to cause the surfaces thereof to become chemically reactively clean and fusible to one another to form a porous, coherent mass of predetermined shape at relatively low temperatures and pressures without the addition of binder materials;

separating said powder and the portion of said liquid entrained with the powder while in said zone to form a powder and liquid mixture;

washing said powder and liquid mixture in a solvent selected from the group of liquid aromatic and aliphatic hydrocarbons being chemically non-reactive with said powder and having a boiling point less than about 130° C.;

drying said powder to drive off any liquid and solvent entrained with the powder and form dry powder; and compressing said dry powder at a relatively low preselected temperature and pressure to fuse the particles of powder together to form a coherent, porous mass of predetermined shape, said mass being adaptable as an anodic electrode of a galvanic cell having a relatively high energy density capacity.

6. The method in accordance with claim 5 and providing a conductive grid between portions of said dry powder prior to said step of compressing.

7. The method in accordance with claim 5 and controlling said step of compressing to provide a preselected degree of volume reduction of said dry powder in respect to the size of particles to establish a predetermined volume porosity of said mass.

8. The method in accordance with claim 7 wherein said predetermined volume porosity of said mass corresponds to a void percentage of about not less than 15% to not more than about 70%.

9. The method in accordance with claim 5 and wherein further, in said step of compressing, said preselected temperature is not more than about 150° C., and said pressure is not more than about 6000 p.s.i.

References Cited

UNITED STATES PATENTS

| 1,569,484 | 1/1926 | Hall | 241—16 |
| 3,043,896 | 7/1962 | Herbert et al. | 136—6 |

WINSTON A. DOUGLAS, *Primary Examiner.*

C. F. LEFEVOUR, *Examiner.*